June 17, 1941.   L. B. NEIGHBOUR ET AL   2,245,935
TONGUE SUPPORT
Filed Sept. 12, 1940
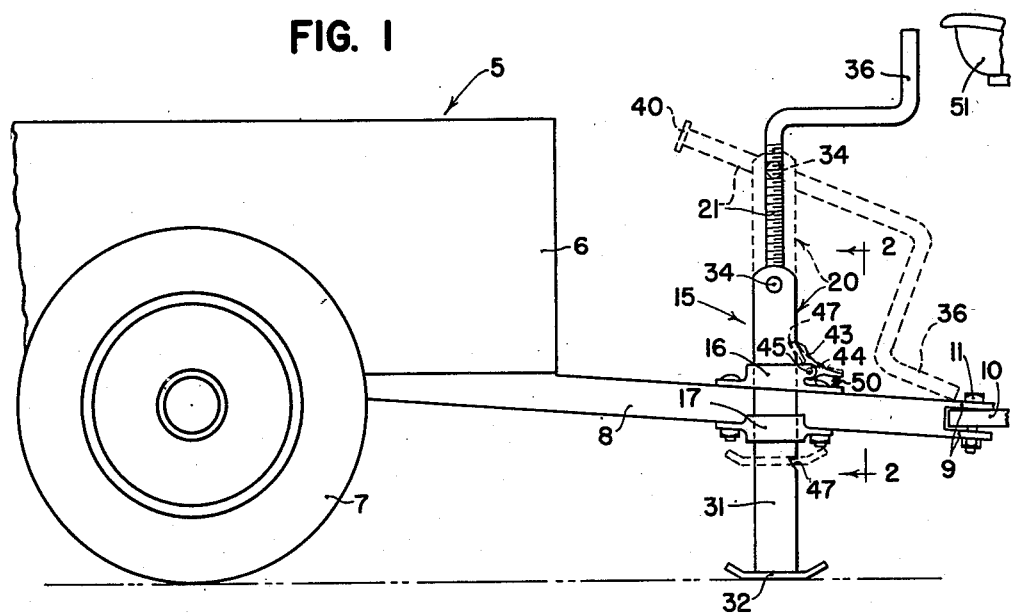
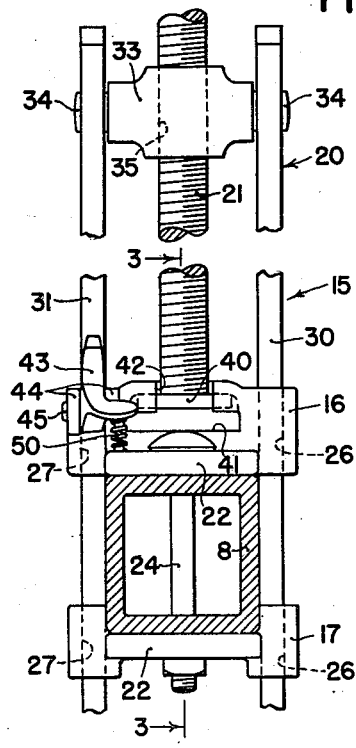
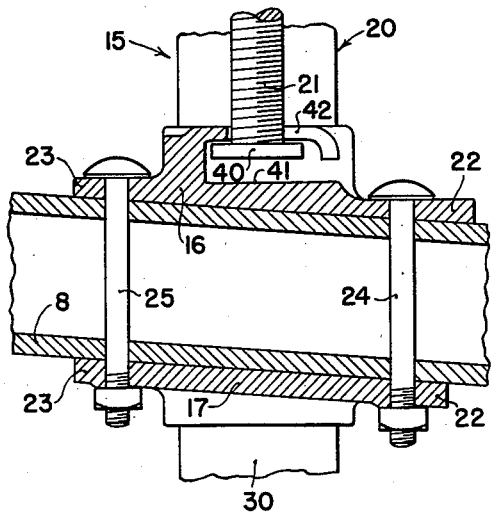
INVENTORS
LEONARD B. NEIGHBOUR
FRANK T. COURT
BY
ATTORNEYS.

Patented June 17, 1941

2,245,935

UNITED STATES PATENT OFFICE 2,245,935

TONGUE SUPPORT

Leonard B. Neighbour and Frank T. Court, Moline, Ill., assignors to Deere & Company, Moline, Ill., a corporation of Illinois Application September 12, 1940, Serial No. 356,466

8 Claims. (Cl. 254—86)

The present invention relates generally to trailer vehicles of the two-wheeled type wherein part of the weight of the trailer is supported on the drawbar of the propelling tractor, and is more particularly concerned with means for supporting the draft tongue of the trailer when the trailer is disconnected from the tractor.

The principal object of the present invention is the provision of a new and improved jack stand having means for adjusting the height of the trailer draft tongue above the ground so that the hitch connection can be raised or lowered to the height of the tractor drawbar.

Another object of this invention is the provision of a jack stand in which the supporting leg can be raised quickly to and held in transport position independently of the elevating means after the leg has been relieved of its load.

A further object is to provide a jack stand having elevating means which folds over, when the leg is in transport position, to lie on the vehicle draft tongue out of the way of the operator at his station on the tractor.

These and other objects and advantages of the present invention will be apparent after consideration of the following detailed description of the preferred embodiment thereof, reference being had to the accompanying drawing, Figure 1 is a side elevation of a two-wheeled spreader having a jack stand built in accordance with the principles of the present invention;

Figure 2 is an enlarged fragmentary view taken substantially along the line 2—2 in Figure 1; and Figure 3 is a vertical section taken through the jack stand along the line 3—3 in Figure 2.

Referring now to the drawing, the reference numeral 5 indicates generally a trailer vehicle such as a manure spreader, comprising a body 6 supported on a pair of laterally spaced wheels 7, only one of which is shown in Figure 1. A box beam draft tongue 8 is fixed to the under side of the body 6 and extends forwardly and somewhat downwardly therefrom. The front end of the draft tongue 8 is provided with a pair of vertically spaced forwardly extending bars 9, which are adapted to receive the drawbar 10 of a tractor between them and are secured thereto by a coupling pin 11.

The jack stand is indicated in its entirety by the reference numeral 15 and comprises a pair of guide members 16 and 17 fixedly mounted on the top and bottom surfaces, respectively, of the draft tongue 8, a supporting leg 20 slidable vertically within the guide members between ground engaging and transport positions, and an elevating screw 21. The guide members 16, 17 are preferably castings, and are formed to lie flush against the top and bottom surfaces of the draft tongue 8. Both guide members 16, 17 have front and rear extensions 22 and 23, which are apertured to receive fastening bolts 24 and 25, extending through vertically aligned holes in the top and bottom walls of the draft tongue 8. The guide members 16, 17 project laterally outwardly beyond both sides of the draft tongue 8 and have two pairs of vertically aligned apertures or ways 26, 27, formed therein which receive the leg 20.

The leg 20 comprises a pair of laterally spaced parallel bars 30 and 31 disposed within the guideways 26, 27 for vertical sliding movement, and having a foot or ground plate 32 welded to their lower ends. A trunnion block 33 is positioned between the bars 30, 31 near their upper ends and has laterally extending pivots 34 which are journaled in suitable apertures in the bars. The trunnion block 33 has a central, vertically disposed threaded aperture 35 through which the elevating screw 21 is threaded.

The elevating screw 21 is disposed in a vertical plane between the bars 30, 31, and is swingable about the pivots 34 of the trunnion block between a normal or operative position, shown in solid lines in Figure 1, and a transport or inoperative position, indicated in broken lines. The upper end of the screw 21 is bent to form a hand crank 36, and the lower end of the screw has a washer or radial flange 40 welded thereto, which cooperates with the top guide member 16 in a manner to be described presently, to provide a releasable support connnection between the elevating screw and the draft tongue 8.

The top guide member 16 is formed to provide a pocket or recess 41 adapted to receive the washer 40 and having a generally T-shaped slot 42 to permit the washer and screw 21 to be inserted into the pocket from the front end thereof. The edges of the pocket 41 adjacent the slot 42 overlie and rest upon the flange 40 so that the weight of the draft tongue is supported on the screw 21, which is supported, in turn, on the leg 20 through the trunnion block 33. At the same time, the screw 21 is free to turn relative to the guide member 16 and can be turned up or down through the trunnion block 33 to raise or lower the draft tongue.

To raise the jack stand to transport position, the elevating screw 21 is first turned so as to lift the leg 20 slightly above the ground, then the screw is swung smartly in a counterclockwise direction about the trunnion pivot 34 to carry the washer 40 forwardly out of the pocket 41. The leg 20 is then lifted by hand to transport position and is engaged and held in place by a spring-pressed detent or latch 43. The latch 43 is disposed between a pair of lugs 44 projecting forwardly from the front edge of the top guide member 16, and is pivotally connected therewith intermediate its ends by a pin 45. The upper, or rear end of the latch 43 is wedge-shaped and engages a notch 47 in the leg bar 31, while the lower or front end of the latch is engaged by a spring 50 based on the front extension 22, which urges the rear end toward the bar 31. The latch is released from the leg 20 by pressing downwardly on the front end thereof, and the leg 20 is then free to drop to the ground.

When the leg 20 is in raised transport position, the elevating screw 21 is folded down out of the way of the operator riding on the tractor seat 51, by swinging the screw about the trunnion pivot 34 to an inclined position of rest with the crank handle 36 resting on the draft tongue 8, as shown in dotted lines in Figure 1. In this position, the screw is well out of the way and is effectively prevented from interfering with the operator or catching on the seat 51 when the tractor and trailer 5 are driven over rough ground.

It is believed that the operation of our invention and the advantageous features thereof will be apparent from the foregoing description, and what we claim and desire to secure by Letters Patent is:

1. In a vehicle, the combination of a draft member, a leg member supported on the draft member for vertical movement relative thereto between ground engaging and transport positions, and elevating means carried by one of said members and engageable with the other member to raise and lower the leg, said elevating means being movable out of engagement with said other member to allow the leg to be raised quickly to transport position.

2. In a vehicle, the combination of a draft member, a supporting leg member connected with said draft member for vertical movement relative thereto between ground engaging and transport positions, a trunnion block pivoted on one of said members, and an elevating screw threaded through said trunnion block and having releasable connection with the other of said members whereby said screw can be swung out of engagement with said other member and the leg member raised quickly to transport position.

3. A jack stand for a vehicle comprising a guide member fixed to the vehicle, a supporting leg member disposed for vertical movement relative to the guide member between ground engaging and transport positions, a trunnion block journaled on one of said members, an elevating screw having threaded engagement with said trunnion block, flange means on said elevating screw engageable with the other of said members to raise and lower said leg, said elevating screw being swingable about the pivots of said trunnion block to disengage said flange means from said other member to allow the leg to be raised quickly to transport position, and means for holding the leg in raised transport position.

4. A jack stand for a vehicle comprising a guide member fixed to the vehicle, a leg movable vertically with respect to the guide member, an elevating screw, a member connected with said leg and having threaded engagement with said screw, means providing a releasable connection between said screw and said guide member whereby the draft tongue is supported on the elevating screw, said leg being movable vertically to raised transport position when said connection is released, and a spring-pressed detent on said guide member engageable with said leg to hold the same in transport position.

5. A jack stand for a vehicle comprising a guide member fixed to the vehicle, a ground engaging leg movable vertically with respect to the guide, a member pivoted to said leg for rotation about a horizontal axis, an elevating screw threaded through said member and having means at one end thereof adapted to engage and hold said guide member, said screw being swingable about the axis of said pivoted member to disengage said guide member so that the leg can be raised quickly to transport position, and means releasably connecting said leg with said guide member to hold the leg in raised transport position.

6. For use with a two-wheeled vehicle having a draft tongue, a jack stand comprising a guide member fixed to the draft tongue, a leg comprising a pair of laterally spaced bars engaged by said guide member for vertical movement between ground engaging and transport positions, a trunnion block positioned between said bars and pivotally connected therewith for swinging movement in a vertical plane, an elevating screw threaded through the trunnion block, said screw having a radially outwardly extending flange at one end thereof adapted to engage said guide member to support the draft tongue, said elevating screw being swingable about the pivots of the trunnion block to disengage said flange from the guide member and allow the leg to be raised quickly to transport position, and a detent mounted on said guide member and engageable with one of said bars for holding the leg in transport position.

7. For use with a two-wheeled tractor-drawn vehicle having a draft tongue, a jack stand comprising a guide member fixed to the draft tongue, a leg movable vertically with respect to the guide member between ground engaging and transport positions, a normally vertical elevating screw connected with said leg for vertical swinging movement, and holding means on said guide member adapted to receive and hold said screw whereby the leg is raised or lowered relative to the guide member when the screw is turned, said elevating screw being swingable out of engagement with said holding means to an inclined inoperative position out of the way of the operator at his station on the tractor when said leg is in raised transport position.

8. For use with a vehicle having a draft tongue, a jack stand comprising a leg movable vertically relative to the draft member, a trunnion block pivoted on said leg for swinging movement in a vertical plane, a normally vertically disposed elevating screw threaded through said trunnion block and having a crank handle at the upper end thereof, holding means fixed to said draft member and adapted to engage the lower end of the elevating screw whereby the leg is raised or lowered relative to the draft member when the screw is turned, said screw being swingable out of engagement with the holding means to a position with said crank handle resting on the draft member, and means for securing said leg in raised transport position when said screw is disengaged from said holding means.

LEONARD B. NEIGHBOUR.
FRANK T. COURT.